US012762043B2

(12) United States Patent
Fukuda et al.

(10) Patent No.: US 12,762,043 B2
(45) Date of Patent: Oct. 13, 2026

(54) IN-VEHICLE ELECTRONIC CONTROL UNIT FOR PROGRAM VERIFICATION

(71) Applicant: HITACHI ASTEMO, LTD., Hitachinaka (JP)

(72) Inventors: Takeshi Fukuda, Tokyo (JP); Tasuku Ishigooka, Tokyo (JP); Masashi Mizoguchi, Tokyo (JP); Takashi Murakami, Hitachinaka (JP); Kazuyoshi Serizawa, Hitachinaka (JP); Tomohito Ebina, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 294 days.

(21) Appl. No.: 18/580,980

(22) PCT Filed: Feb. 8, 2022

(86) PCT No.: PCT/JP2022/004834
§ 371 (c)(1),
(2) Date: Jan. 19, 2024

(87) PCT Pub. No.: WO2023/037576
PCT Pub. Date: Mar. 16, 2023

(65) Prior Publication Data

US 2024/0330166 A1 Oct. 3, 2024

(30) Foreign Application Priority Data

Sep. 7, 2021 (JP) ................................ 2021-145559

(51) Int. Cl.
*G06F 11/36* (2025.01)
*G06F 11/34* (2006.01)
(Continued)

(52) U.S. Cl.
CPC ...... *G06F 11/3688* (2013.01); *G06F 11/3409* (2013.01); *G06F 11/3604* (2013.01);
(Continued)

(58) Field of Classification Search
CPC ............. G06F 11/3688; G06F 11/3409; G06F 11/3604; G06F 11/3676; G06F 11/36;
(Continued)

(56) References Cited

U.S. PATENT DOCUMENTS 10,896,116 B1 * 1/2021 Gabrovski .......... G06F 11/3616
11,210,200 B2 * 12/2021 Morley ............... G06F 11/3608
(Continued)

FOREIGN PATENT DOCUMENTS

CN 110378483 A1 10/2019
CN 110642530 A1 1/2020
(Continued)

OTHER PUBLICATIONS

International Search Report and Written Opinion, with English Translations, of International Patent Application No. PCT/JP2022/004834, mailed Mar. 15, 2022, 10 pages.
(Continued)

*Primary Examiner* — Anibal Riveracruz
(74) *Attorney, Agent, or Firm* — Foley & Lardner LLP

(57) ABSTRACT

For verification of the performance and safety of a program installed an in-vehicle electronic control unit (ECU), a computation of first control software is executed when a vehicle is in a first state and a computation of second control software is executed when the vehicle is in a second state. Input data from a sensor to the first control software and to the second control software is saved, and output data from the first control software and the second control software are
(Continued)

saved. The performance of the second control software is evaluated, based on a difference between pieces of output data read.

15 Claims, 15 Drawing Sheets

(51) Int. Cl.

| | |
|---|---|
| ***G06F 11/3604*** | (2025.01) |
| ***G06F 11/3668*** | (2025.01) |
| *B60W 60/00* | (2020.01) |

(52) U.S. Cl.

CPC ...... *B60W 60/0057* (2020.02); *G06F 11/3457* (2013.01); *G06F 11/3612* (2013.01); *G06F 11/3668* (2013.01); *G06F 11/3672* (2013.01); *G06F 11/3676* (2013.01); *G06F 11/3692* (2013.01)

(58) Field of Classification Search

CPC ............. G06F 11/3664; G06F 11/3612; G06F 11/3692; G06F 8/60; G06F 8/71; G06F 8/75; G06F 11/3457; G06F 11/3668; G06F 11/3672

See application file for complete search history.

(56) References Cited

U.S. PATENT DOCUMENTS

| | | | | |
|---|---|---|---|---|
| 11,919,529 | B1 * | 3/2024 | Venkatraman | B60W 50/045 |
| 2019/0318267 | A1 * | 10/2019 | Zhang | G06N 20/00 |
| 2020/0012239 | A1 * | 1/2020 | Yamamoto | G06F 11/3696 |
| 2020/0159180 | A1 * | 5/2020 | Ishigooka | G06F 11/2035 |
| 2021/0316782 | A1 * | 10/2021 | Lee | B62D 1/181 |
| 2022/0024471 | A1 * | 1/2022 | Itatsu | G06F 11/30 |
| 2022/0252413 | A1 * | 8/2022 | Mezaael | G01C 21/3697 |
| 2023/0050149 | A1 | 2/2023 | Shimamura | |

FOREIGN PATENT DOCUMENTS

| | | | |
|---|---|---|---|
| JP | 2015-190956 | A | 11/2015 |
| JP | 2018-190349 | A | 11/2018 |
| WO | WO-2018/180143 | A1 | 10/2018 |
| WO | WO-2021/166167 | A1 | 8/2021 |

OTHER PUBLICATIONS

Chinese First Office Action issued in CN Application No. 202280050203.4, mailed Apr. 1, 2026 with English translation (18 pages).

* cited by examiner

IN-VEHICLE ELECTRONIC CONTROL UNIT FOR PROGRAM VERIFICATION

CROSS-REFERENCE TO RELATED APPLICATIONS

This application is a U.S. National Phase Application of International Patent Application No. PCT/JP2022/004834, filed Feb. 8, 2022, which claims priority to Japanese Patent Application No. 2021-145559, filed Sep. 7, 2021, the full disclosure of each is incorporated herein by reference in its entirety.

TECHNICAL FIELD

The present invention relates to a vehicle control system and a vehicle control method.

BACKGROUND ART

For verification of the performance and safety of a program installed an in-vehicle electronic control unit (ECU), a verification technique called shadow testing or shadow mode testing is effective, which runs a program to be verified to check an output value as the vehicle is traveling. In verification by shadow testing or shadow mode testing, for example, a verified program is run normally as a program to be verified is run in the background at the same time, and an output value from the verified program and an output value from the program to be verified are compared with each other to confirm the performance and safety of the program to be verified.

At this time, the output value from the program to be verified is not used to operate actuators, such as an accelerator and a brake. Even if a problem develops in the program to be verified, therefore, it does not affect the operation of the traveling vehicle. It is thus possible to evaluate the performance and safety of the program to be verified while maintaining the safety of the driver. In recent years, to process various input data, a technology utilizing artificial intelligence (AI) has been applied to the ECU. AI allows a process by which the correspondence between input data and output data is not uniquely determined. This makes it necessary for a developer to verify what kind of output data is generated by a process that AI performs during traveling of the vehicle.

Now techniques described in Patent Literature 1 to 3 are known as techniques for verifying a program including AI or the like.

Patent Literature 1 carries a description: "Based on a deviation between output variables from a real test at/on a real bench testing machine or a real roller test stand and output variables from a virtual test at a virtual bench testing machine or a virtual roller test stand, whether an identification function that reacts to test conditions is present can be determined. Then, whether control and/or adjustment of the automobile is altered according to the presence or absence of the identification function can be determined."

Patent Literature 2 carried a description: "An inspection apparatus automatically creates an inspection scenario including an inspection program that verifies a problem (inspection item) with an in-vehicle apparatus by only selecting the problem. In addition, the inspection apparatus can write the created inspection scenario to a storage medium."

Patent Literature 3 carries a description: "By comparing a sequence of operations that a program run by a program execution control unit calls according to environment information with a sequence of operations defined by a behavior verification scenario in order, a program itself can be evaluated or verified without using an actual machine, such as a simulator or an adaptive controller."

CITATION LIST

Patent Literature

PTL 1: JP 2018-190349 A
PTL 2: JP 2015-190956 A
PTL 3: WO 2018/180143 A

SUMMARY OF INVENTION

Technical Problem

The technique described in Patent Literature 1 is mainly used to inspect software of a controller of the automobile when simulating an operation of the automobile. For simulation of behavior of the traveling automobile, on the other hand, a computer device showing higher performance compared to an in-vehicle ECU is used.

In this case, the in-vehicle ECU is not able to run the software described in Patent Literature 1.

According to the technique described in PTL 2, the inspection program is executed by the in-vehicle apparatus. When inspection of the in-vehicle apparatus is completed, the storage medium having inspection results written thereto is removed from the in-vehicle apparatus and is connected to the inspection apparatus. Hence a method of handling a problem with the in-vehicle apparatus can be selected. Because of this process, when the technique is applied to an automobile that is traveling in an actual traffic situation, handling of a problem with the in-vehicle device is delayed.

A plurality of application programs described in Patent Literature 3 include one or more defined operations, one or more behavior plans, and one or more behavior verification scenarios, and are allowed to be present together on the same autonomous vehicle. However, the computational capability of a multi-core processor incorporated in an built-in control system of an automobile or the like is limited. Because in-vehicle calculation resources are limited, running high-load programs, such as programs for autonomous driving, simultaneously on multiple processor cores is difficult, in which case the number of executable programs is limited.

The present invention has been conceived in view of the above circumstances, and it is therefore an object of the invention to enable shadow mode testing for comparing output values from a plurality of pieces of control software.

Solution to Problem

A vehicle control system according to the present invention includes: a computation unit that executes a computation of first control software when a vehicle is in a first state, the computation unit executing a computation of second control software when the vehicle is in a second state; a saving unit that saves input data inputted from a sensor to the first control software and to the second control software, the saving unit saving output data that the first control software and the second control software output as a result of a computation executed with input data as input; and an evaluation unit that compares pieces of output data outputted respectively from the first control software and the second control software, the output data being read from the storage unit, to evaluate performance of the second control software.

Advantageous Effects of Invention

The present invention enables shadow mode testing that compares output data obtained by executing the computation of the first control software when the vehicle is in the first state with output data obtained by executing the computation of the second control software when the vehicle is in the second state, thereby evaluating the performance of the second control software.

Problems, configurations, and effects that are not described above will be made clear by the following description of embodiments.

DESCRIPTION OF EMBODIMENTS

Embodiments of the present invention will hereinafter be described with reference to the accompanying drawings. In this specification and the accompanying drawings, constituent elements that are substantially the same in function or configuration are denoted by the same reference signs to omit redundant description.

A vehicle control system according to the present invention has sensors and actuators connected to each other.

The vehicle control system is configured such that sensor data from a sensor is inputted to the vehicle control system as an input value, and an output value from the vehicle control system is outputted to an actuator. It should be noted, however, that the present invention can be applied to a wide range of vehicle control systems equipped with control software, regardless of a configuration of input sources and output destinations.

First Embodiment

Figure 1:
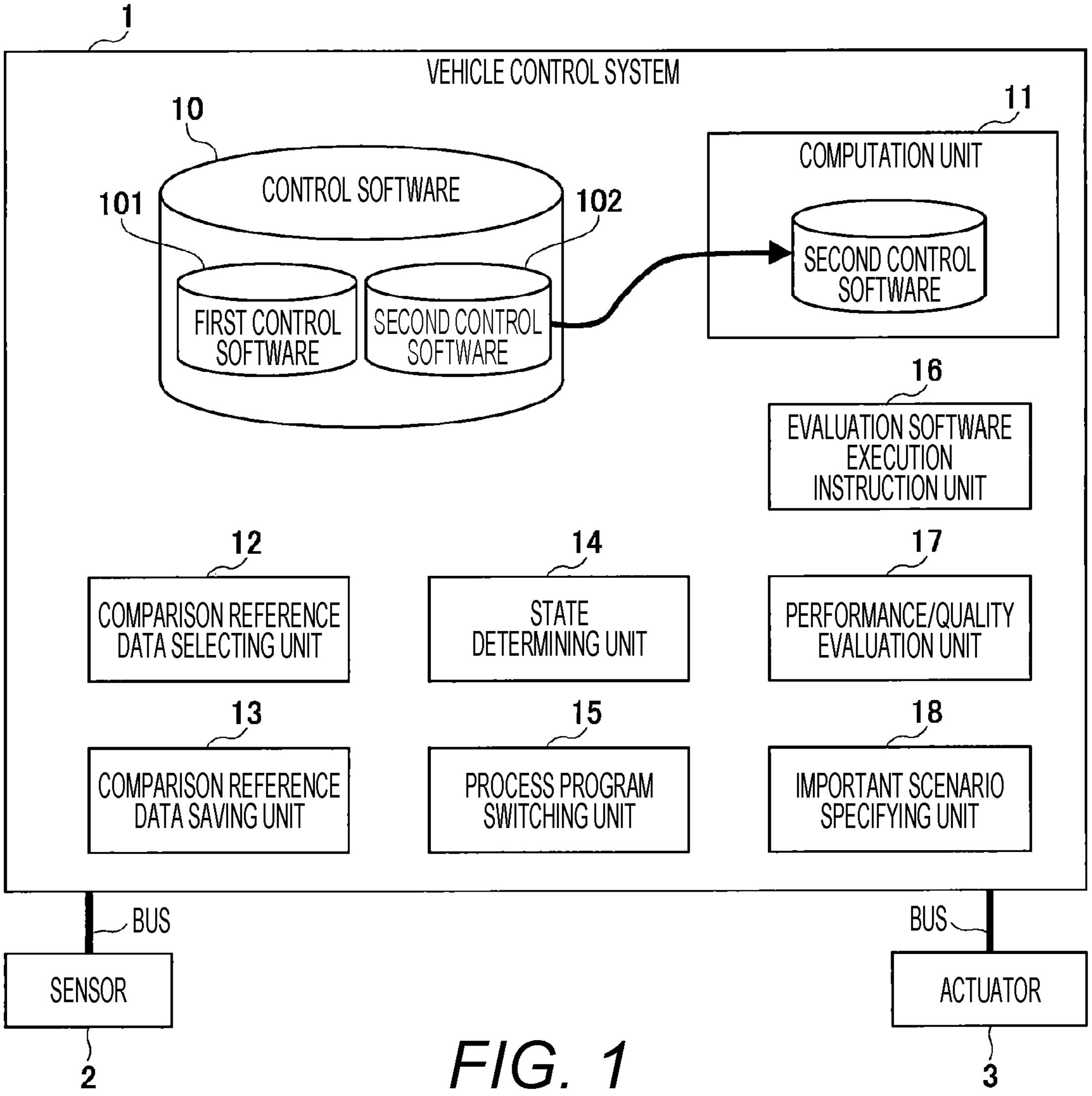
FIG. 1 is a block diagram of an example of an overall configuration of a vehicle control system according to a first embodiment of the present invention.

FIG. 1 is a block diagram of an example of an overall configuration of a vehicle control system 1 according to a first embodiment of the present invention. This vehicle control system 1 is a system incorporated in a vehicle capable of autonomous driving, and includes a plurality of electronic control units (ECU) connected via a network.

The vehicle control system 1 is connected to a sensor 2 and an actuator 3 via a bus (BUS). The vehicle control system 1 has a role of receiving sensor data (e.g., image data) from the sensor 2 (e.g., an imaging sensor), the sensor data being input to the vehicle control system 1, and sending output data (e.g., control data) from the vehicle control system 1, to the actuator 3.

The vehicle control system 1 includes control software 10, a computation unit 11, a comparison reference data selecting unit 12, a comparison reference data saving unit 13, a state determining unit 14, a process program switching unit 15, an evaluation software execution instruction unit 16, a performance/quality evaluation unit 17, and an important scenario specifying unit 18.

The control software 10 includes first control software 101 and second control software 102. The first control software 101 is verified software, and is executed when the vehicle is in operation. Because both the first control software 101 and the second control software 102 have a high processing load, the computation unit 11 cannot execute both software simultaneously. For this reason, the second control software 102 is treated as software to be verified, and is executed in an idle time of the vehicle control system 1.

The computation unit (computation unit 11) executes a computation of the first control software (first control software 101) when the vehicle is in a first state, and executes a computation of the second control software (second control software 102) when the vehicle is in a second state. In the following description, the vehicle being in the first state is referred to also as the vehicle control system 1 being in a state A, and the vehicle being in the second state is referred to also as the vehicle control system 1 being in a state B. The computation unit 11 cannot simultaneously execute the first control software 101 and the second control software 102 because both of them have a high processing load. However, control software executed by the computation unit 11 is switched in accordance with a state of the vehicle, in which case the operation of the second control software 102 can be verified without hindering autonomous driving of the vehicle. Thus, following a process program switching instruction from the process program switching unit 15, the vehicle control system 1 causes either the first control software 101 or the second control software 102 at the computation unit 11 to perform computation. FIG. 1 shows a state in which the computation unit 11 is executing the second control software 102. It should be noted that in this specification, the first control software 101 or second control software 102 and a program almost mean the same.

An example of state transition of the vehicle control system 1 will now be described.

Figure 2:
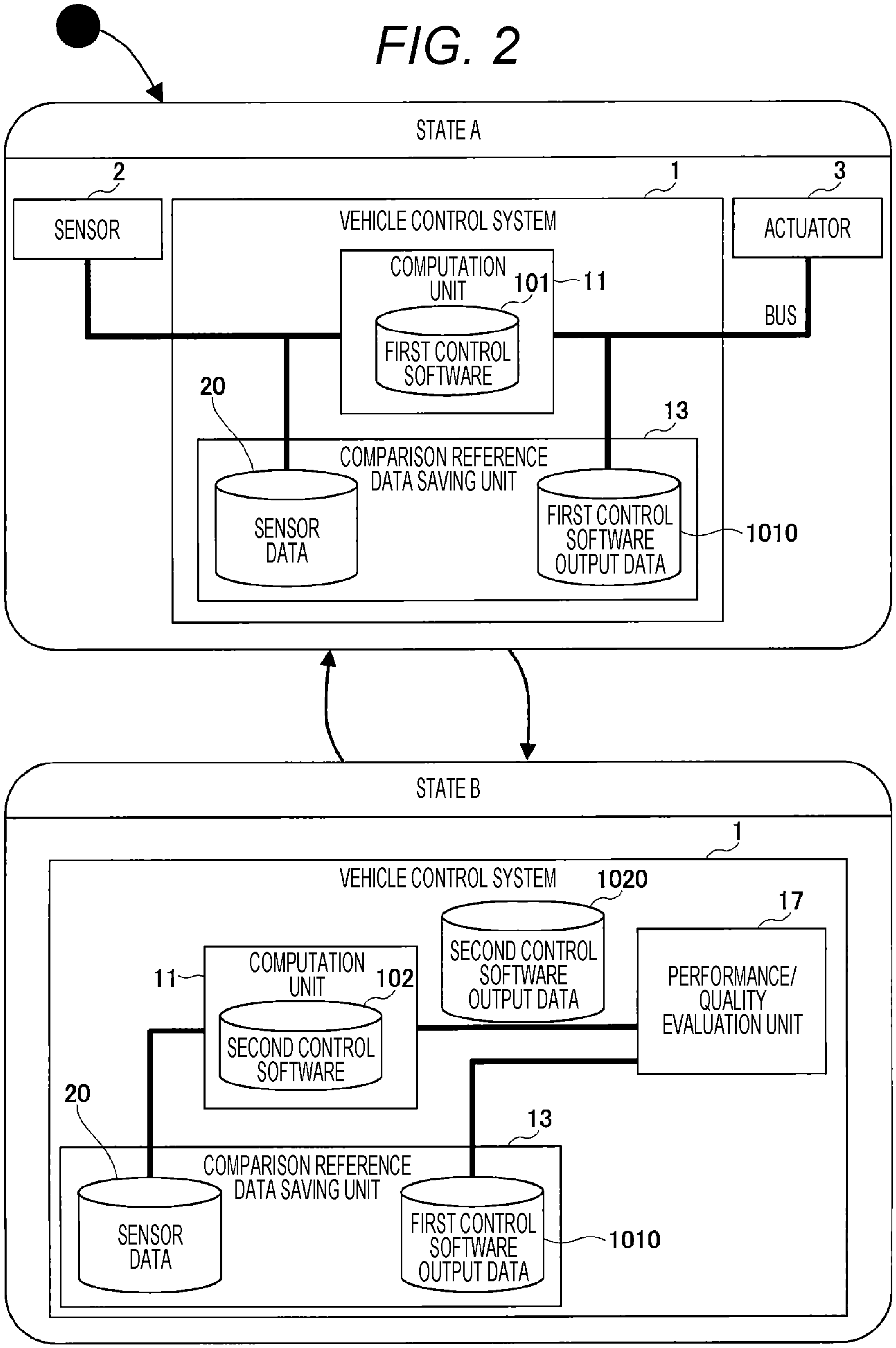
FIG. 2 depicts an example of state transition of the vehicle control system according to the first embodiment of the present invention.

FIG. 2 depicts an example of state transition of the vehicle control system 1 according to the first embodiment.

An initial node, which is a black circle at the upper left of FIG. 2, indicates that the power supply of the vehicle has been turned on by the driver to start a process by the vehicle control system 1.

The vehicle control system 1 has two states, i.e., a state A and a state B.

First, an example of an internal process that is executed when the vehicle control system 1 is in the state A will be described. The state A is a state in which the vehicle is performing autonomous driving. An outline of an operation the vehicle control system 1 carries out in the state A is shown in the upper half of FIG. 2.

In the state A, the vehicle control system 1 receives sensor data 20, which is input to the vehicle control system 1, from the sensor 2. The computation unit 11 executes the first control software 101 and outputs first control software output data 1010 to the actuator 3. For example, when receiving image data as the sensor data 20, the first control software 101 carries out a process of recognizing an object reflected in the image, and generates a control signal necessary for an operation of the vehicle.

For example, the first control software 101 may recognize a road lane on which the vehicle is running, the position of a different vehicle nearby, and the like, using the sensor data 20 obtained from each sensor 2 using a sensor fusion function, and generate a control signal for instructing the actuator 3 to accelerate or brake the vehicle. In addition, the first control software 101 may determine a lane on which the vehicle travels, based on an image recognition result, and generate an operation signal for operating the steering. These signals are outputted to the actuator 3 as the first control software output data 1010.

The saving unit (comparison reference data saving unit 13) saves input data inputted from the sensor (sensor 2) to the first control software (first control software 101) and to the second control software (second control software 102), and output data that the first control software (first control software 101) and the second control software (second control software 102) output as a result of computation executed with input data as input.

For example, the comparison reference data saving unit 13 saves the sensor data 20 and the first control software output data 1010. As a result, input data and output data used by the first control software 101 are stored as a set of data, in the comparison reference data saving unit 13. Because each data is stored in the comparison reference data saving unit 13, the second control software 102 can execute a process similar to a process of the first control software 101 or the developer can extract data to verify the data after the first control software 101 executes its process.

An example of an internal process that is executed when the vehicle control system 1 is in the state B will then be described. For example, when the vehicle control system 1 becomes a state of an idle time, state transition from the state A to the state B occurs. Determination on the idle time is made, for example, at a point of time at which the vehicle control system 1 detects brake application, and state transition from the state A to the state B occurs when the vehicle stops. Another case is assumed where the vehicle control system 1 operates in the state A when the vehicle traveling on an expressway operates in autonomous driving mode, and transitions to the state B to operate in the state B when the vehicle travels on an ordinary road and therefore needs the driver's steering operation. Further, when the vehicle is stopped in a parking lot and an in-vehicle battery is charged, the vehicle control system 1 may operate in the state B. An outline of an operation of the vehicle control system 1 in the state B to which the vehicle control system 1 in the state A has transitioned is shown in the lower half of FIG. 2.

In the state B, the computation unit 11 and the comparison reference data saving unit 13 are used as used in the state A. However, the performance/quality evaluation unit 17 is activated in the state B.

The computation unit 11 receives the sensor data 20 stored in the comparison reference data saving unit 13 and executes the second control software 102. The computation unit 11 then outputs second control software output data 1020 to the performance/quality evaluation unit 17. In the state B, the second control software output data 1020 is not outputted to the actuator 3, and therefore the actuator 3 being operated by the second control software output data 1020 does not happen. For example, when autonomous driving is switched to manual driving, the vehicle control system 1 transitions to the state B. When the vehicle control system 1 becomes a state of idle time during manual driving, data of an amount of brake application resulting from the driver's stepping on the brake is transmitted to the actuator 3, which brakes the vehicle.

The evaluation unit (performance/quality evaluation unit 17) compares output data outputted from the first control software (first control software 101) with output data outputted from the second control software (second control software 102), both output data being read from the saving unit (comparison reference data saving unit 13), to evaluate the performance of the second control software (second control software 102). For example, the performance/quality evaluation unit 17 comparatively evaluates a difference between the first control software output data 1010 and the second control software output data 1020 that are stored in the comparison reference data saving unit 13, thereby implementing shadow mode testing. The first control software 101 and the second control software 102, which output the data comparatively evaluated by the performance/quality evaluation unit 17, are executed respectively in the state A and the state B, i.e., different states. It is therefore unnecessary to run a plurality of pieces of control software in parallel in the vehicle control system 1. As a result, the vehicle control system 1 does not require a high-performance ECU that allows simultaneous processing of a plurality pieces of control software.

Examples of processes carried out by the vehicle control system 1 will then be described with reference to FIGS. 3 to 9.

Figure 3:
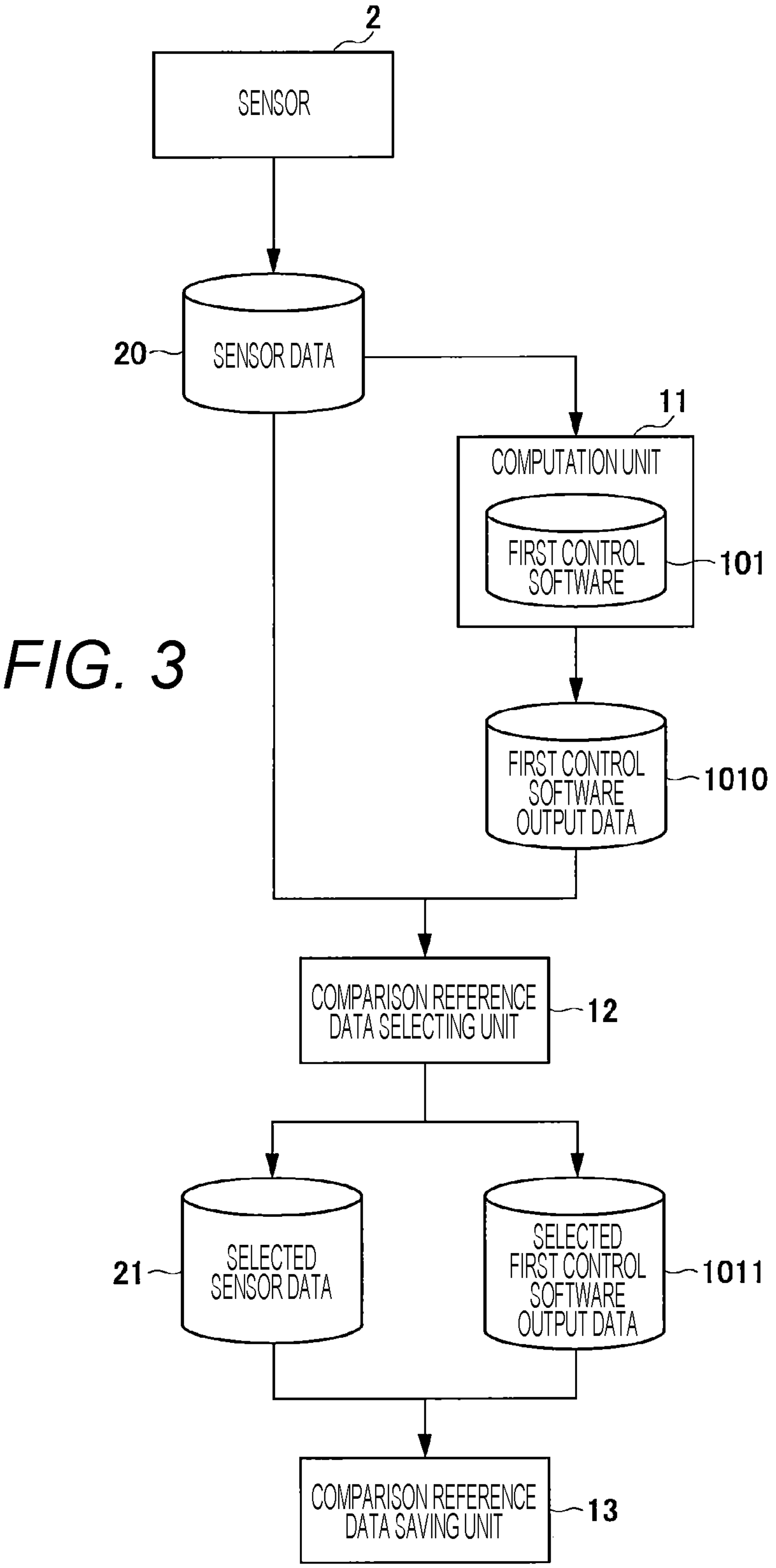
FIG. 3 depicts an example of a data flow in a state A of the vehicle control system according to the first embodiment of the present invention.

FIG. 3 depicts an example of a data flow in the state A of the vehicle control system 1 according to the first embodiment of the present invention.

As described above, the sensor data 20 from the sensor 2 is inputted to the vehicle control system 1.

The computation unit 11 uses the sensor data 20 as input data, the sensor data 20 being output from the sensor 2, executes the first control software 101, and outputs the first control software output data 1010.

The selecting unit (comparison reference data selecting unit 12) selects input data and output data that the evaluation unit (performance/quality evaluation unit 17) uses to evaluate the second control software (second control software 102), from input data inputted to the first control software (first control software 101) and output data outputted from the first control software (first control software 101), and stores the selected input data and output data in the saving unit (comparison reference data saving unit 13). The selecting unit (comparison reference data selecting unit 12) selects data to be stored in the saving unit (comparison reference data saving unit 13) as an important scenario for evaluation of the second control software (second control software 102) by the evaluation unit (performance/quality evaluation unit 17), based on output data outputted from the first control software (first control software 101).

For example, the comparison reference data selecting unit 12 receives the sensor data 20 and the first control software output data 1010, and selects necessary data as verification data for verification of the second control software 102 to be verified. The comparison reference data selecting unit 12 then outputs selected sensor data 21 and selected first control software output data 1011, to the comparison reference data saving unit 13. An example of data necessary as the verification data is data inputted to the first control software 101. It should be noted, however, that saving all the output data from the sensor 2 as the sensor data 20 requires an enormous recording capacity. For this reason, for example, data that is known to be data on which the first control software 101 makes an error in determination when the data is inputted to the first control software 101 is selected. An example of such data is an image captured by the sensor 2 that shows a van body truck carrying a picture of a person drawn on its back door. In a case where the first control software 101, to which such an image is inputted as input data, erroneously determines a picture of a person to be an actual person, in what way the second control software 102 determines such an image is verified.

In another case, the first control software 101 may not be able to correctly detect a person, a vehicle, or the like on an image when processing the image captured by the sensor 2 in a rainy situation or a backlight environment. In this case, as in the above case, in what way the second control software 102 detects an image the first control software 101 has failed to detect correctly is verified.

In this manner, as the sensor data 20, only the partial sensor data 21 selected from the sensor data 20 is used for operation verification of a software group included in the control software 10. This allows a reduction in the recording capacity of a recording medium for saving the sensor data 20.

The comparison reference data saving unit 13 stores therein the selected sensor data 21 and the selected first control software output data 1011. Data selected from the sensor data 20 and first control software output data 1010, which are stored in the comparison reference data saving unit 13 as shown in FIG. 2, are the selected sensor data 21 and the selected first control software output data 1011 that are described with reference to FIG. 3.

Details of a process of the comparison reference data selecting unit 12 will then be described.

Figure 4:
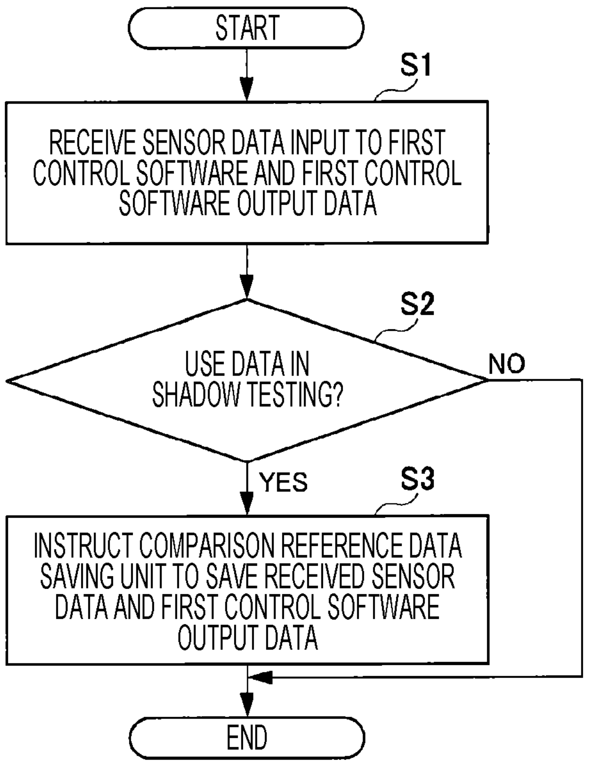
FIG. 4 is a flowchart showing an example of a process procedure of a comparison reference data selecting unit according to the first embodiment of the present invention.

FIG. 4 is a flowchart showing an example of a process procedure of the comparison reference data selecting unit 12 according to the first embodiment. Flowcharts of FIG. 4 and other figures to follow each depict an example of a vehicle control method of the vehicle control system 1.

First, the comparison reference data selecting unit 12 receives the sensor data 20, which is inputted to the first control software 101, and the first control software output data 1010 (S1).

Subsequently, the comparison reference data selecting unit 12 determines whether or not to use the sensor data 20 and first control software output data 1010, which are received at step S1, in shadow mode testing (S2). When the comparison reference data selecting unit 12 determines that these pieces of data should be used in the shadow mode testing (YES at S2), the sensor data 20 and the first control software output data 1010 are data to be saved, in which case the process flow proceeds to step S3. Examples of data stored in this case include image data captured in a bad weather condition and image data erroneously detected by the first control software 101.

At step S3, the comparison reference data selecting unit 12 instructs the comparison reference data saving unit 13 to save the sensor data 20 and the first control software output data 1010 that are received at step S1 (S3), and the process comes to an end. As a result, the sensor data 20 and the first control software output data 1010 are stored in the comparison reference data saving unit 13.

When the comparison reference data selecting unit 12 determines at step S2 that the pieces of data is not data that should be used in the shadow mode testing (NO at S2), on the other hand, the process comes to an end without executing any particular step. In this case, the sensor data 20 received at step S1 and the first control software output data 1010 are not saved.

A flow of data that results when state transition of the vehicle control system 1 is determined will then be described.

Figure 5:
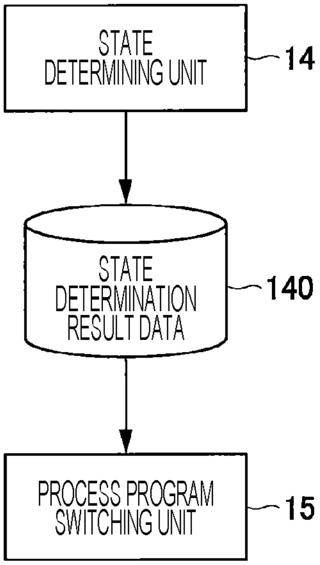
FIG. 5 depicts an example of a data flow that results when state transition of the vehicle control system according to the first embodiment of the present invention is determined.

FIG. 5 depicts an example of a data flow that results when state transition of the vehicle control system 1 according to the first embodiment is determined.

The state determining unit (state determining unit 14) determines whether the vehicle is in the first state or the second state, based on the availability of computation resources on which the computation unit (computation unit 11) operates. The state determining unit (state determining unit 14) determines whether available computation resources on which the computation unit (computation unit 11) operates are present, based on at least one of an autonomous driving service offering range, the vehicle's being in a charging mode, the vehicle's being stopped, or load information on a computer incorporated in the vehicle, and determines whether the evaluation unit (performance/quality evaluation unit 17) can execute evaluation of the second control software (second control software 102). The autonomous driving service offering range refers to a scene where the vehicle travels in the autonomous driving mode, which corresponds to, for example, a situation where the vehicle is traveling on an expressway. The vehicle's being in a charging mode refers to, for example, a state in which a charger is connected to the stopped vehicle and an in-vehicle battery (not illustrated) is charged. The vehicle's being stopped refers to, for example, a case where the vehicle is waiting at a traffic light or is temporarily stopped on a road shoulder. Load information on a computer is, for example, information on load measurements of a computer 60 shown in FIG. 15 to be referred to later. Because a state of the vehicle is determined in the above manner, the second control software 102 is executed with no hinderance in autonomous driving of the vehicle arises.

When the state determining unit (state determining unit 14) determines that no available computation resources is present, the switching unit (process program switching unit 15) specifies the first control software (first control software 101) as control software by which the computation unit (computation unit 11) executes computation. When the state determining unit determines that available computation resources are present, on the other hand, the switching unit switches the control software by which the computation unit (computation unit 11) executes computation, from the first control software (first control software 101) to the second control software (second control software 102). A process program switched by the process program switching unit 15 is either the first control software 101 or the second control software 102.

In this manner, based on the presence or absence of idle time of the vehicle control system 1, i.e., the presence or absence of available computation resources determined by the state determining unit 14, the process program switching unit 15 determines whether it is all right to cause the vehicle control system 1 to transition from the state A to the state B or, conversely, from the state B to the state A. The state determining unit 14 then generates an idle time determination result, as state determination result data 140. The state determination result data 140 is data including a result of determination on the state of data subjected to computation at the computation unit 11. Because software to be executed at the computation unit 11 is selected after the state of the vehicle is determined, a case where interruption by a process of the second control software 102 occurs in the state A to hinder autonomous driving does not arise. In addition, even when the vehicle control system 1 is in the state B and the process of the second control software 102 is in progress, once the state A is determined, a process of the first control software 101 is quickly resumed, so that no hinderance in autonomous driving of the vehicle results.

Details of a process of the state determining unit 14 will then be described.

Figure 6:
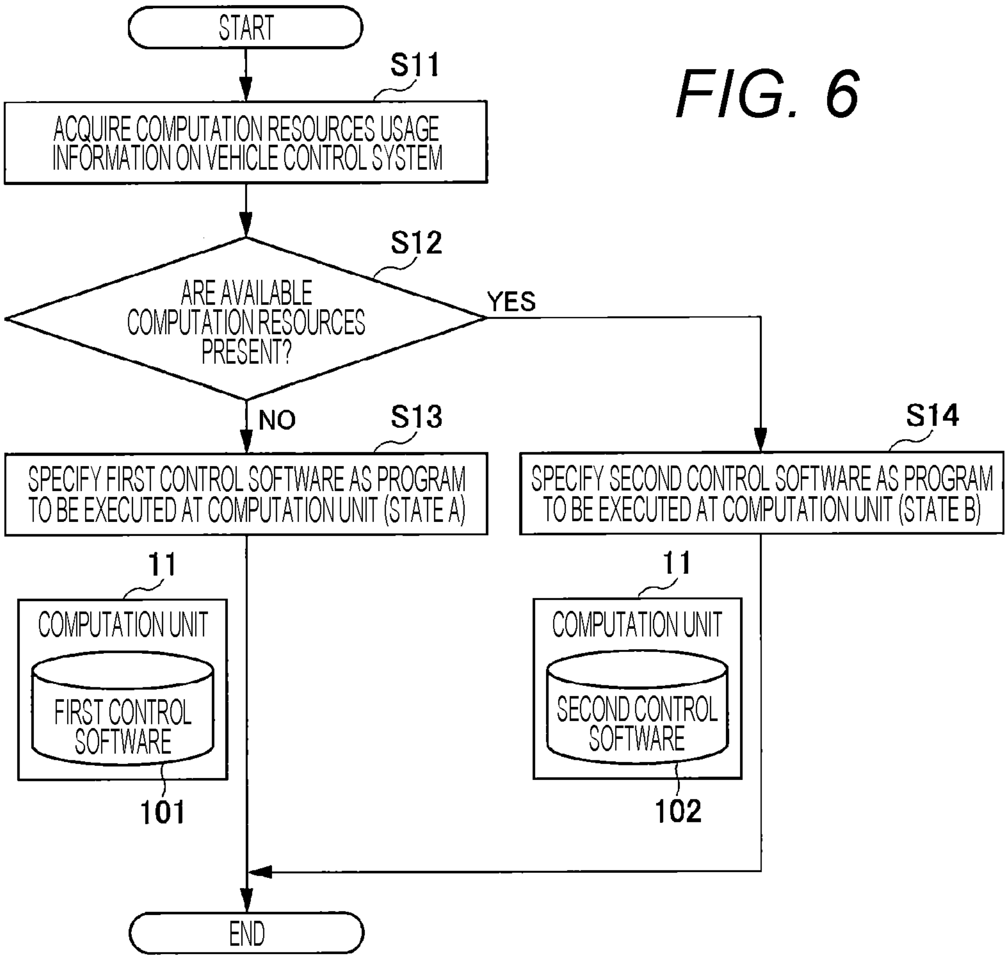
FIG. 6 is a flowchart showing an example of a process procedure of a state determining unit according to the first embodiment of the present invention.

FIG. 6 is a flowchart showing an example of a process procedure of the state determining unit 14 according to the first embodiment.

First, the state determining unit 14 acquires computation resource usage rate information on the vehicle control system 1 (S11). The computation resource usage rate information is, for example, information on a load factor, a memory usage rate, etc., of the computer 60 (see FIG. 15 to be referred to later) of the vehicle control system 1.

The state determining unit 14 determines whether a sufficient amount of available computation resources of the vehicle control system 1 is present, based on the computation resource usage rate information (S12). When determining that a sufficient amount of available computation resources is not present (NO at S12), the state determining unit 14 outputs state determination result data 140 specifying the first control software 101 in the state A as a program to be processed at the computation unit 11 of the vehicle control system 1 (S13), and ends the process procedure.

When determining that a sufficient amount of available computation resources is present (YES at S12), the state determining unit 14 outputs state determination result data 140 specifying the second control software 102 in the state B as a program to be processed at the computation unit 11 of the vehicle control system 1 (S14), and ends the process procedure. In a process executed by the second control software 102 when available computation resources are present, the selected data is used. An amount of data the process of the second control software 102 needs is therefore reduced, in which case consumed computation resources are less than those consumed by the first control software 101.

Thereafter, the process program switching unit 15 shown in FIG. 5 switches the program processed at the computation unit 11 of the vehicle control system 1 to either the first control software 101 or the second control software 102, according to the content of the state determination result data 140 generated by the state determining unit 14.

The execution instruction unit (the evaluation software execution instruction unit 16) instructs the computation unit (the computation unit 11) to execute computation using the second control software (the second control software 102), which is the switched program resulting from switching by the switching unit (the process program switching unit 15), with input data stored as an important scenario in the saving unit (the comparison reference data saving unit 13) being processed as input. A computation by the second control software 102 is not executed immediately after the vehicle transitions to the state B but is started when the instruction from the evaluation software execution instruction unit 16 is received. Because of this procedure, the process of the second control software 102 is not started before completion of post-processing or the like in the state A and therefore unnecessary data used in processing in the state A is not mixed in the process of the second control software 102.

It should be noted that when the vehicle control system 1 transitions from the state B to the state A, the state determining unit 14 determines the availability of the computation resources, as in the case of transition from the state A to the state B, and when no available computation resources is present, the process program switching unit 15 switches a program processed at the computation unit 11 to the first control software 101. Then, the evaluation software execution instruction unit 16 gives an instruction to start execution of the computation of the first control software 101 in the state A.

A flow of data in the vehicle control system 1 in the state B will then be described.

Figure 7:
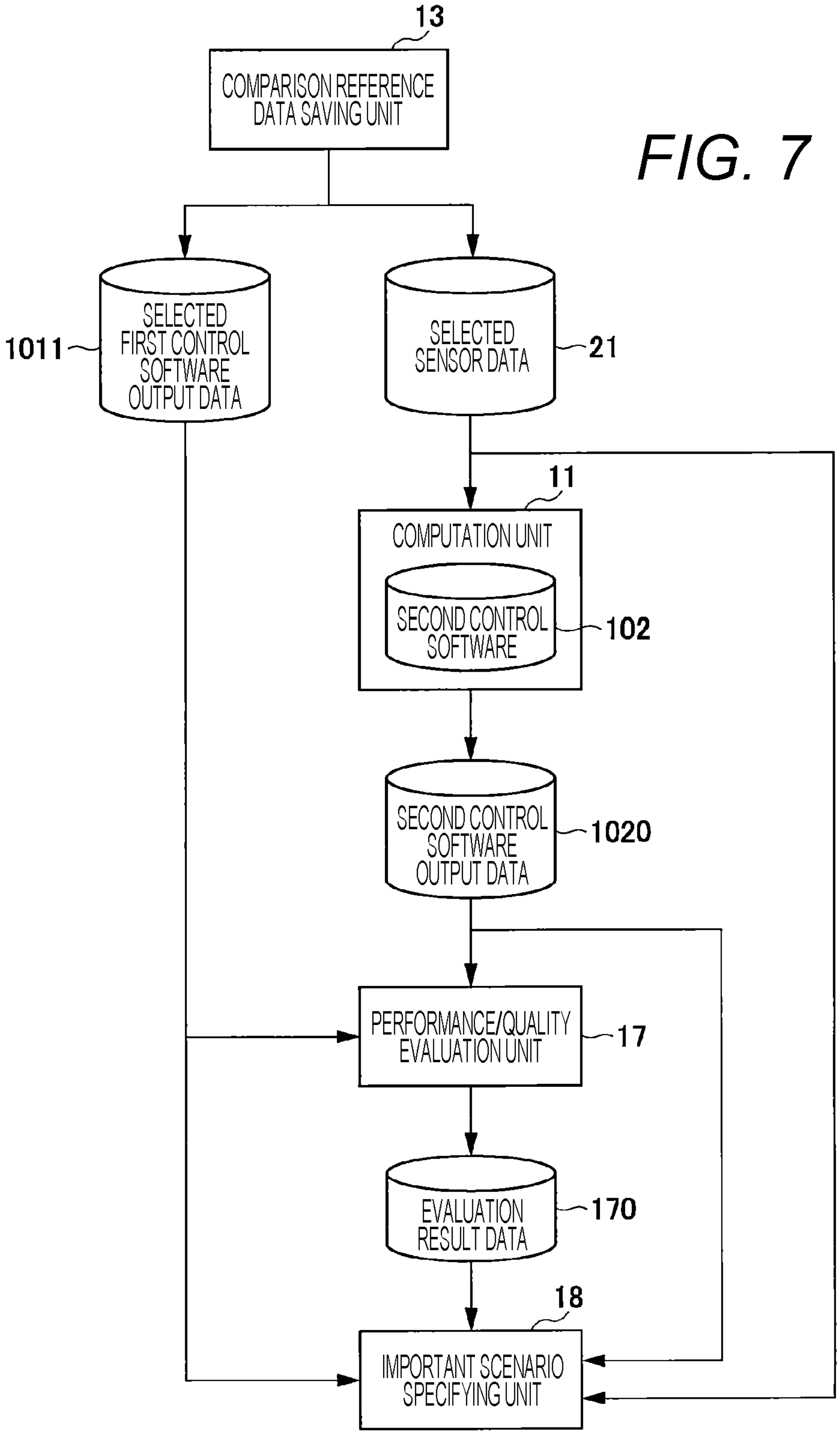
FIG. 7 depicts an example of a data flow in a state B of the vehicle control system according to the first embodiment of the present invention.

FIG. 7 depicts an example of a data flow in one state (state B) of the vehicle control system 1 according to the first embodiment.

As shown in FIG. 2, the comparison reference data saving unit 13 outputs the selected first control software output data 1011 and the selected sensor data 21 that are stored inside the comparison reference data saving unit 13.

Upon receiving the selected sensor data 21, the computation unit 11 executes the second control software 102. The second control software 102 then outputs the second control software output data 1020.

The performance/quality evaluation unit 17 receives the selected first control software output data 1011 and the second control software output data 1020, evaluates both of the received data and respective performances and qualities of both control software having outputted the data, and outputs the evaluation result data 170. Performance and quality refers to, for example, the functionality of each of the first control software 101 and the second control software 102 and to the validity of output results. The functionality of the first control software 101 and of the second control software 102 represents functions of each of these pieces of software, and includes, for example, an object detection function and a function of generating a track for the vehicle in the autonomous driving mode. The performance/quality evaluation unit 17 determines whether an executed function of each software is a function required. For example, in the case of the object detection function, whether the function has correctly detected an object like a person, a sign, etc., is determined. In the case of the function of generating a track, whether the function has correctly generated a track to allow the vehicle to travel not on a sidewalk but on a roadway is determined. The validity of the output results represents a result of determination on whether an intended output result has been obtained by execution of software, the determination being made by the performance/quality evaluation unit 17. Evaluation of the performance and quality of data and control software, the evaluation being made by the performance/quality evaluation unit 17, is collectively referred to as “performance evaluation”.

The important scenario specifying unit (important scenario specifying unit 18) receives an evaluation result from the evaluation unit (performance/quality evaluation unit 17), input data and output data selected by the selecting unit (comparison reference data selecting unit 12), and output data outputted from the second control software (second control software 102), and specifies data to be stored in the saving unit (comparison reference data saving unit 13) as an important scenario, based on the evaluation result. For example, the important scenario specifying unit 18 receives the selected sensor data 21, the selected first control software output data 1011, the second control software output data 1020, and the evaluation result data 170. The important scenario specifying unit 18 then determines whether each piece of data received is important, based on the content of the data. A scenario represents a pattern of input data inputted to each software and output data. An important scenario the developer wants to save for later verification is referred to as an “important scenario”. Specifying an important scenario spares trouble of storing a huge amount of input/output data in the comparison reference data saving unit 13, thus preventing a pressed situation where little recording capacity is left.

The important scenario specifying unit (the important scenario specifying unit 18) specifies an important scenario including output data from the first control software (the first control software 101) and output data from the second control software (the second control software 102), both output data being evaluated as unmatched data in the evaluation result. Using the specified important scenario allows the important scenario specifying unit 18 to easily find out, by comparison, what kind of difference has occurred between the output data from the first control software 101 and the output data from the second control software 102. For example, the important scenario specifying unit 18 checks whether the performance of the second control software 102 has been improved, compared with the performance of the first control software 101. When the performance of the second control software 102 has been not improved, the selected sensor data 21, the selected first control software output data 1011, and the second control software output data 1020 are discarded. In this case, newly developed second control software 102 is distributed to the vehicle, in which a computation of the distributed second control software 102 is executed.

There may be a case where the developer of the vehicle control system 1 wants to directly check data content, regardless of an evaluation result. There may also be a case where AI-utilized control software that performs computation makes different judgements on the same inputted data (e.g., image data) and outputs different pieces of output data as a consequence. Such input data and output data are data that the developer hopes to make good use of it for control software development. In this case, the important scenario specifying unit 18 may keep input data to the second control software 102, the input data being used when the performance of the second control software 102 is evaluated by the performance/quality evaluation unit 17.

Details of a process of the performance/quality evaluation unit 17 will then be described.

Figure 8:
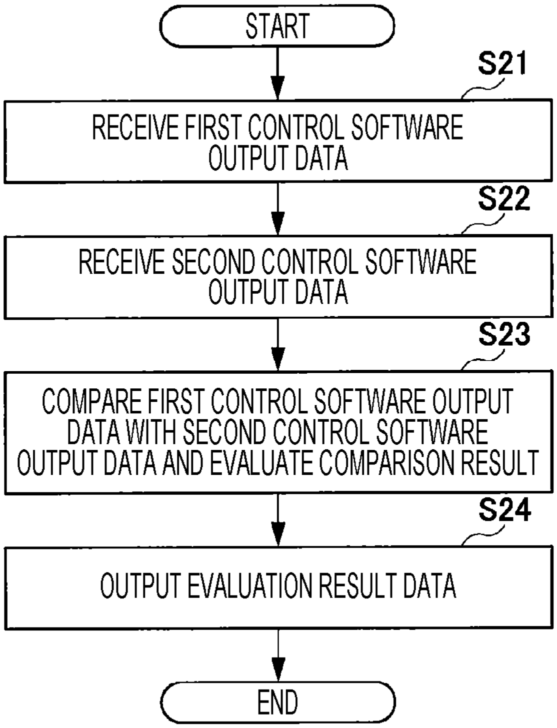
FIG. 8 is a flowchart showing an example of a process procedure of a performance/quality evaluation unit according to the first embodiment of the present invention.

FIG. 8 is a flowchart showing an example of a process procedure of the performance/quality evaluation unit 17 according to the first embodiment.

First, the performance/quality evaluation unit 17 receives the selected first control software output data 1011 (S21). Subsequently, the performance/quality evaluation unit 17 receives the second control software output data 1020 (S22).

Subsequently, the performance/quality evaluation unit 17 compares the selected first control software output data 1011 with the second control software output data 1020, evaluates a comparison result, and generates evaluation result data 170 (S23). The performance/quality evaluation unit 17 then outputs the evaluation result data 170 (S24), and ends the process.

It is assumed, for example, that in a case where a truck approaches the vehicle from the front side thereof, the first control software 101, which has a function of detecting an object from an image, is able to recognize the truck from the position of the sensor 2 and an image. It is also assumed that the second control software 102 recognizes the incoming vehicle from the front side as a truck, as the first control software 101 does, using the image the first control software 101 has used when recognizing the vehicle, as input to the second control software 102. In this case, the performance/quality evaluation unit 17 can determine whether the object detection function of the second control software 102 deserves a good evaluation or whether the performance of the object detection function is declining. However, there is a possibility that the first control software 101 and the second control software 102 may recognize the size of the vehicle from the image, as different sizes. In this case, if the first control software 101 erroneously recognizes the incoming vehicle as a wagon but the second control software 102 correctly recognizes the incoming vehicle as a truck, the performance/quality evaluation unit 17 can give an evaluation that the performance of the object detection function of the second control software 102 has improved.

Details of a process of the important scenario specifying unit 18 shown in FIG. 1 will then be described.

Figure 9:
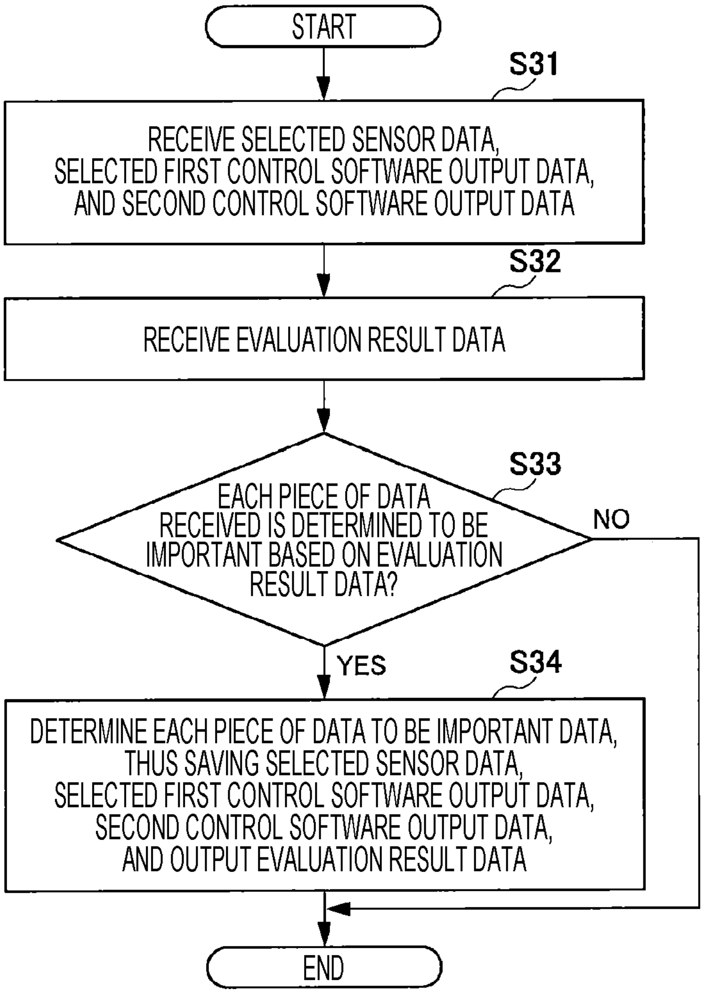
FIG. 9 is a flowchart showing an example of a process procedure of an important scenario specifying unit according to the first embodiment of the present invention.

FIG. 9 is a flowchart showing an example of a process procedure of the important scenario specifying unit 18 according to the first embodiment.

First, the important scenario specifying unit 18 receives the selected sensor data 21, the selected first control software output data 1011, and the second control software output data 1020 (S31).

Subsequently, the important scenario specifying unit 18 receives the evaluation result data 170 (S32).

Subsequently, the important scenario specifying unit 18 determines whether each piece of data received is important, based on the evaluation result data 170 (S33).

When determining that the received data is important data (YES at S33), the important scenario specifying unit 18 stores the data in the vehicle control system 1 (S34), and ends the process. Pieces of data stored in the vehicle control system 1 include the selected sensor data 21, the selected first control software output data 1011, the selected second control software output data 1020, and the evaluation result data 170. Each data stored in the vehicle control system 1 is copied to, for example, a portable storage medium, such as a USB memory, and is used by the developer to verify data content or develop new software.

When determining that the received data is not important (NO at S33), on the other hand, the important scenario specifying unit 18 does not store the data in the vehicle control system 1, and ends the process.

In the above-described vehicle control system 1 according to the first embodiment, the group of control software making up the control software 10 are executed at different timings, using the same selected sensor data 21 as an input. The comparison reference data saving unit 13 saves not all the input data from the sensor 2 but only the specific data, as the sensor data 20. Data is stored in the vehicle control system 1 at a point of time at which the group of control software subjected to comparison at the performance/quality evaluation unit 17 computes output data or at a point of time at which the driver carries out a specific operation. At a point of time different from the point of time at which the output value is computed or the point of time at which the specific operation is carried out, the performance/quality evaluation unit 17 executes the second control software 102 for verification, using the sensor data 20 stored in the comparison reference data saving unit 13, and compares the second control software output data 1020 with the first control software output data 1010. Because of this, the vehicle control system 1 does not need a high-performance ECU.

In addition, the vehicle control system 1 allows shadow mode testing of a program even if the program is high-load one.

The second control software 102 is operated when behavior of the vehicle is simulated and is operated also in the background using input data obtained from the real vehicle. As a result, the second control software 102 can be verified without impairing the safety of the traveling actual vehicle.

The second control software 102 is assumed to be, for example, software with an AI training model different from that of the first control software 101 or software capable of reducing the load factor of the CPU. Software created by correcting an error included in the first control software 101 already in operation may be verified as the second control software 102. Because such verification is conducted in the vehicle control system 1 incorporated in the real vehicle to which unexpected data is readily inputted, the performance/quality evaluation unit 17 can verify the quality of the second control software 102 using a wide variations of input data (sensor data 20). For example, when the CPU load factor of the first control software 101 is 80% and the CPU load factor of the second control software 102 is 70%, the developer may consider using software used as the second control software 102, as the first control software 101.

In another case where using the second control software 102 with a processing load lighter than that of the first control software 101 used in the vehicle control system 1 offers the second control software output data 1020 with the same quality as the first control software output data 1010, the first control software 101 executed in the automatic driving mode may be replaced with software used as the second control software 102. In this manner, by replacing the first control software 101 with software with a lighter processing load, computation during autonomous driving, which involves enormous calculations, and consumption of computation resources can be suppressed.

[Modification of First Embodiment]

When the first control software (the first control software 101) is running and an output result from the first control software (the first control software 101) is determined to be erroneous, the important scenario specifying unit (the important scenario specifying unit 18) stores data specified as an important scenario, in the saving unit (the comparison reference data saving unit 13). Because of this, when a process result from the first control software 101, which is usually supposed to be normal, turns out to be abnormal, the developer is able to verify data specified as an important scenario and the process content of the first control software 101.

When founding that a result of a sensor fusion process of fusing together a plurality of pieces of input data inputted from a plurality of types of sensors (sensors 2) does not match output data outputted as a result of computation executed by the first control software (first control software 101), the selecting unit (comparison reference data selecting unit 12) determines that an output result from the first control software (first control software 101) is erroneous.

For example, whether an image recognition result is erroneous detection cannot be determined by image recognition software only in some cases. Sensor fusion is a technique of determining an image recognition result, using information acquired from a plurality of different sensors. For example, in a case where light detection and ranging (LiDAR) is used as a sensor, it is assumed that a person standing in front of the vehicle can be recognized by captured image data outputted from a camera and by point cloud data outputted from the LiDAR. If the person standing is recognized based on the image data outputted from the camera but is not recognized by the point cloud data obtained from the LiDAR, either or both of the image data and the point cloud data is incorrect. Meanwhile, if the second control software 102 succeeds in recognizing a person standing, based on either the image data or the point cloud data, it demonstrates the fact that the second control software 102 correctly recognizes the person. When the first control software 101 does not have a function of detecting an object by sensor fusion, therefore, the comparison reference data selecting unit 12 can determine an error in an output result from the first control software 101 by acquiring the evaluation result data 170 and the second control software output data 1020. In this manner, by using the sensor fusion technique, whether an output result from the first control software 101 is correct or not can be determined, based on data recognition results obtained from a plurality of sensors.

When output from the first control software 101 and output from the second control software 102 do not match as a result of sensor fusion during autonomous driving, the vehicle is controlled in such a way as to carry out a safety-side operation (e.g., stoppage of the vehicle) under the assumption that a person is present in front of the vehicle. It should be noted, however, that if a person is actually not standing in front of the vehicle, the first control software 101 or the second control software 102 that erroneously recognizes a person standing needs to be tested again.

When finding that a vehicle traveling log acquired by the vehicle does not match output data outputted as a result of a computation executed by the first control software (the first control software 101), the selecting unit (comparison reference data selecting unit 12) determines that an output result from the first control software (the first control software 101 is erroneous.

The vehicle control system 1 constantly acquires the position of the vehicle by calculations of data from a global positioning system (GPS), of the rotation speed of tires, or the like, and saves the vehicle traveling log. When the first control software 101 has a function of computing a track plan of the vehicle, the comparison reference data selecting unit 12 compares the track plan of the vehicle computed by the first control software 101 with the actual traveling log. If the track plan of the vehicle is different from the actual traveling log, the comparison reference data selecting unit 12 determines that the track plan, that is, output data from the first control software 101 is erroneous.

When finding that map data the vehicle has does not match output data outputted as a result of a computation executed by the first control software (first control software 101), the selecting unit (comparison reference data selecting unit 12) determines that an output result from the first control software (first control software 101) is erroneous.

As described above, the position of the vehicle that is acquired by the vehicle control system 1 is not always correct. There is a case where, although the vehicle is traveling on the road, the position of the vehicle that is computed by the first control software 101 indicates that the vehicle is traveling in a place other than the road. In this case, the comparison reference data selecting unit 12 determines that the position of the vehicle that is computed by the first control software 101, that is, output data from the first control software 101 is erroneous.

Second Embodiment

A vehicle control system and a vehicle control method according to a second embodiment of the present invention will then be described.

The vehicle control system according to the second embodiment is different from the vehicle control system according to the first embodiment in that the vehicle control system 1 is connected to a cloud server via an external network. As a result, the cloud server takes charge of saving functions, processes, and data, which is the process carried out in the vehicle control system 1 in the first embodiment. The same constituent elements as those of the first embodiment will be denoted by the same reference signs and will be omitted in further description.

Figure 10:
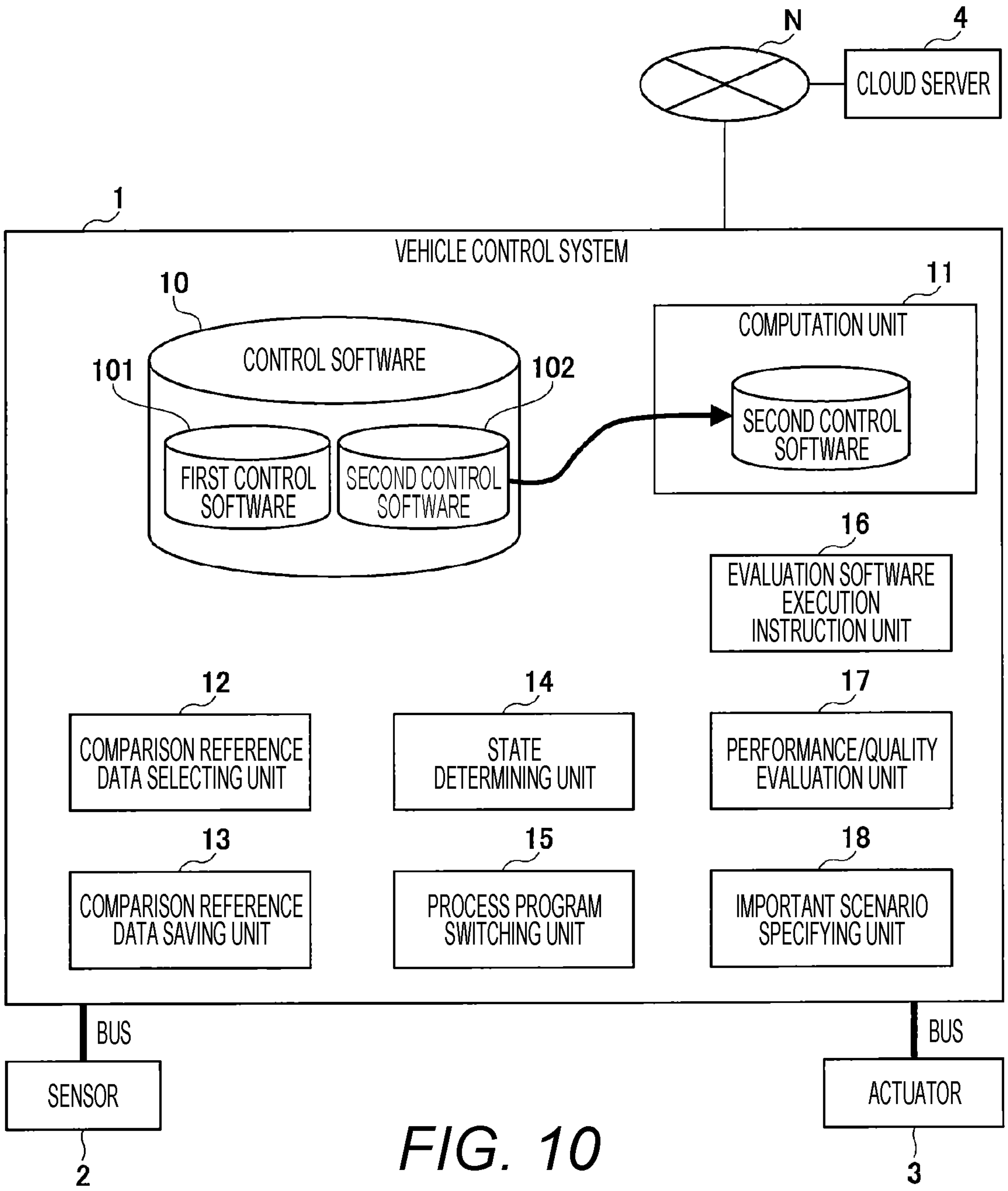
FIG. 10 depicts an example of an overall configuration of a vehicle control system according to a second embodiment of the present invention.

FIG. 10 depicts an example of an overall configuration of a vehicle control system 1 according to the second embodiment.

The vehicle control system 1 is connected to a cloud server 4 via an external network N. In such a configuration, for example, the second control software 102 to be verified can be distributed from the cloud server 4 to the vehicle control system 1, using an over the air (OTA) function. The second control software 102 the vehicle control system 1 receives from the cloud server 4 is stored in the control software 10.

The computation unit (the computation unit 11) executes a computation of the second control software (the second control software 102) received from the cloud server (the cloud server 4) via the network (the external network N), and transmits an evaluation result by the evaluation unit (the performance/quality evaluation unit 17), which is specified as an important scenario by the important scenario specifying unit (the important scenario specifying unit 18), input data and output data selected by the selecting unit (the comparison reference data selecting unit 12), and output data from the second control software (the second control software 102), to the cloud server (the cloud server 4).

The vehicle control system 1 may discard the second control software 102 of which operation verification is completed. Because the second control software 102 is not kept in the vehicle control system 1, computation resources of the vehicle control system 1 can be reduced. The cloud server 4 can provide a vehicle shipped from a vehicle manufacturer with new software. This facilitates upgrading of software and an improvement in vehicle functions.

Figure 11:
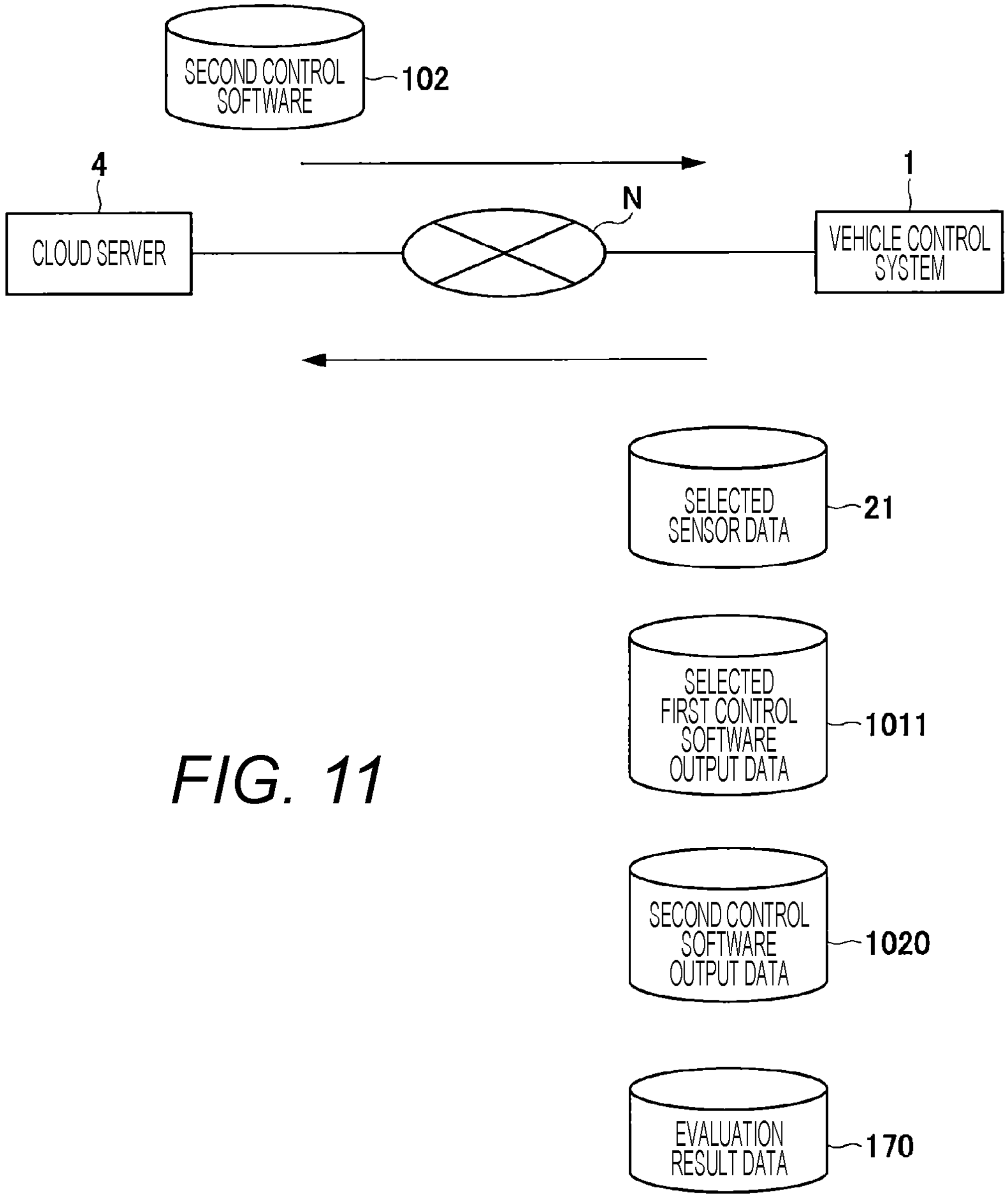
FIG. 11 depicts an example of communication data exchanged between the vehicle control system according to the second embodiment of the present invention and a cloud server.

FIG. 11 depicts an example of communication data exchanged between the vehicle control system 1 according to the second embodiment and the cloud server 4.

The second control software 102, which is a program to be verified by shadow mode testing, is distributed from the cloud server 4 to the vehicle control system 1. Saving a program to be verified in the vehicle control system 1 in advance is, therefore, unnecessary, which is a difference with the first. embodiment.

In addition, the selected sensor data 21, the selected first control software output data 1011, the second control software output data 1020, and the evaluation result data 170 are transmitted from the vehicle control system 1 to the cloud server 4. As a result, for example, a performance/quality evaluation similar to the performance/quality evaluation by the performance/quality evaluation unit 17 can be carried out in the cloud server 4. The cloud server 4 can compare an evaluation result given by processing data received from the vehicle control system 1 with the evaluation result data 170 received from the vehicle control system 1. A process similar to the process by the important scenario specifying unit 18 can be carried out in the cloud server 4.

Hence processing in the vehicle control system 1 can be simplified, which is a difference with the first embodiment.

According to the above-described vehicle control system 1 of the second embodiment, saving the second control software 102 in advance is unnecessary, and the second control software 102 is distributed from the cloud server 4 at intended timing of verification. The vehicle control system 1, therefore, can perform verification using the latest version of second control software 102.

Each data used in the vehicle control system 1 is transmitted to the cloud server 4. The cloud server 4 can execute processes, such as performance/quality evaluation, using the received data. It is therefore possible that the vehicle control system 1 is configured not to include the performance/quality evaluation unit 17 and the important scenario specifying unit 18.

The vehicle control system 1 is able to store a trained program, which is downloaded from the cloud server 4, in the control software 10 as the second control software 102 and to evaluate the performance of the second control software 102. This trained program is, for example, a program created by AI. The cloud server 4 is thus able to verify the safety of trained programs by the vehicle control systems 1 incorporated in a number of vehicles and obtain verification results corresponding to various traveling scenes. Meanwhile, the developer is able to make a decision to refrain from using the second control software 102 or to repair the second control software 102 when finding that the accuracy of an output result from the second control software 102 is lower than the accuracy of an output result from the first control software 101.

It is preferable that even input data and output data indicating a determination that an output result from the first control software 101 is erroneous be stored in the comparison reference data saving unit 13. Such input data and output data are uploaded later from the comparison reference data saving unit 13 to the cloud server 4 so that the developer can acquire the input data and output data and verify their contents. Besides, data indicating a determined that an output result from the first control software 101 is erroneous can be used by the developer for the purpose of developing software with improved functions of the first control software 101. For this reason, the cloud server 4 collects the first control software output data 1010 and the evaluation result data 170 on the second control software 102, the evaluation result data 170 accompanying the first control software output data 1010, from a number of vehicles.

Then, the developer verifies pieces of data accumulated in the cloud server 4, and control software created by remedying a problem with the first control software 101 is distributed as the second control software 102, to the vehicle. Thus, the performance of the second control software 102 can be verified again by shadow mode testing.

Third Embodiment

A vehicle control system and a vehicle control method according to a third embodiment of the present invention will then be described.

The vehicle control system according to the third embodiment is different from the vehicle control system according to the first embodiment in that the vehicle control system 1 is connected to a driver operation sensor 5 via a bus.

Figure 12:
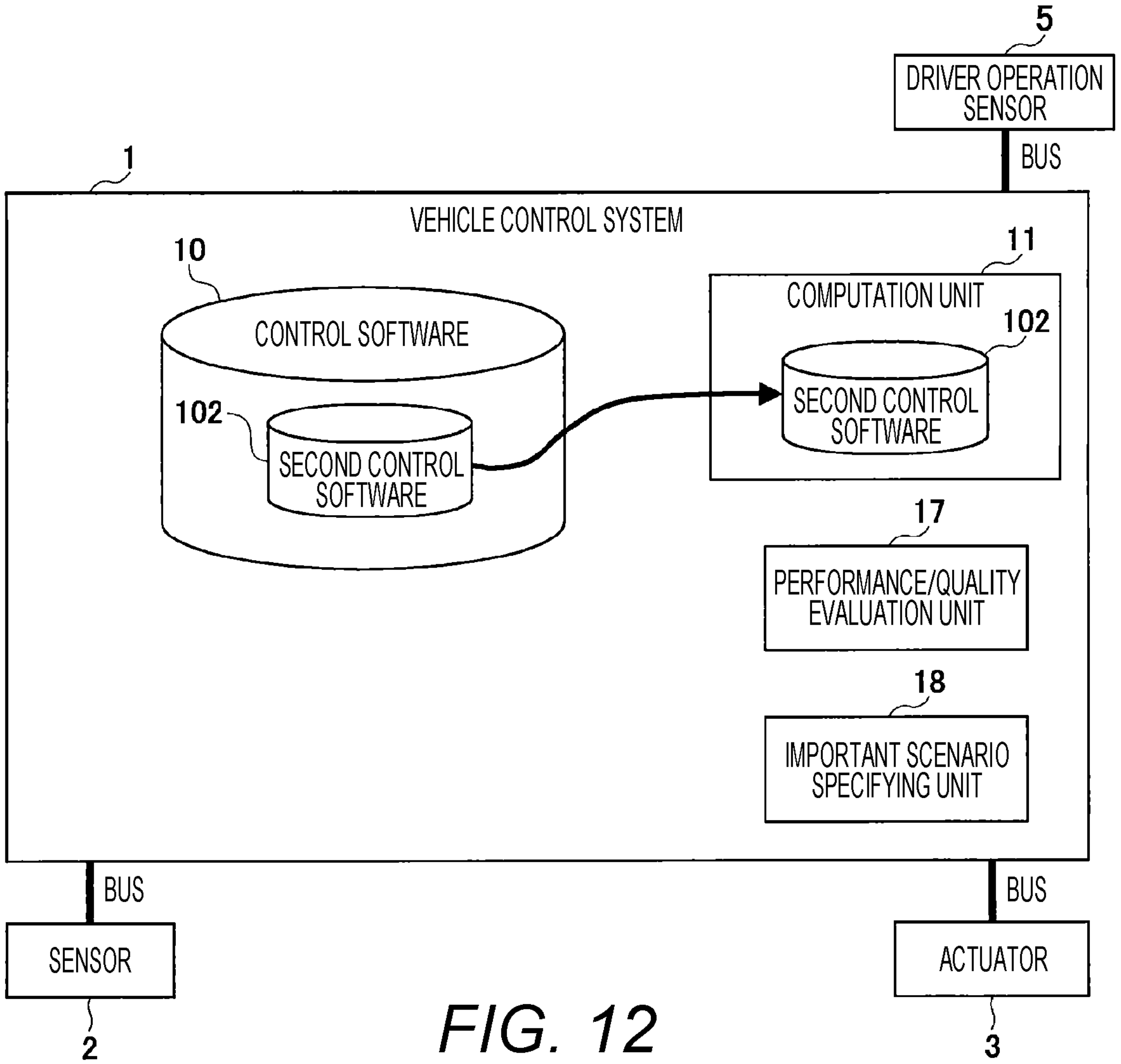
FIG. 12 depicts an example of an overall configuration of a vehicle control system according to a third embodiment of the present invention.

FIG. 12 depicts an example of an overall configuration of a vehicle control system 1 according to the third embodiment.

As described above, the vehicle control system 1 is connected to the driver operation sensor 5.

The driver operation sensor 5 detects an operation of the driver who drives the vehicle, and outputs an operation signal to the vehicle control system 1. The driver's operations include, for example, the driver's operating the steering wheel and stepping on the brake, and the driver's operation amounts include a steering wheel operation angle and a brake step-on amount.

As described above, the vehicle control system 1 according to the first embodiment operates the actuator 3, using the first control software output data 1010. The vehicle control system 1 according to the third embodiment, on the other hand, is configured to obtain the operation amount of an operation carried out by the driver via the driver operation sensor 5 and transmit the obtained operation amount to the actuator 3. In this manner, the process of operating the actuator 3 by autonomous driving according to the first embodiment is replaced with a process by the driver's operation according to the third embodiment, and the vehicle is controlled accordingly.

The evaluation unit (performance/quality evaluation unit 17) thus compares operation data on the driver, which is inputted as the vehicle is traveling, with output data outputted as a result of computation using input data inputted from the sensor (sensor 2) to the second control software (second control software 102), and evaluates the performance of the second control software (second control software 102). The vehicle control system 1 according to the third embodiment, therefore, replaces the process of the first embodiment that is executed at the performance/quality evaluation unit 17 by using the selected first control software output data 1011 and the second control software output data 1020, as comparison reference data for shadow testing, with a process using a driver's operation amount obtained via the driver operation sensor 5 and the second control software output data 1020. Using output data from the first control software 101 according to the first embodiment is unnecessary for operation of the actuator 3, and driving of the vehicle is controlled based on a steering wheel operation or amount of stepping on the brake by the driver, which is output data from the operation sensor 5.

Figure 13:
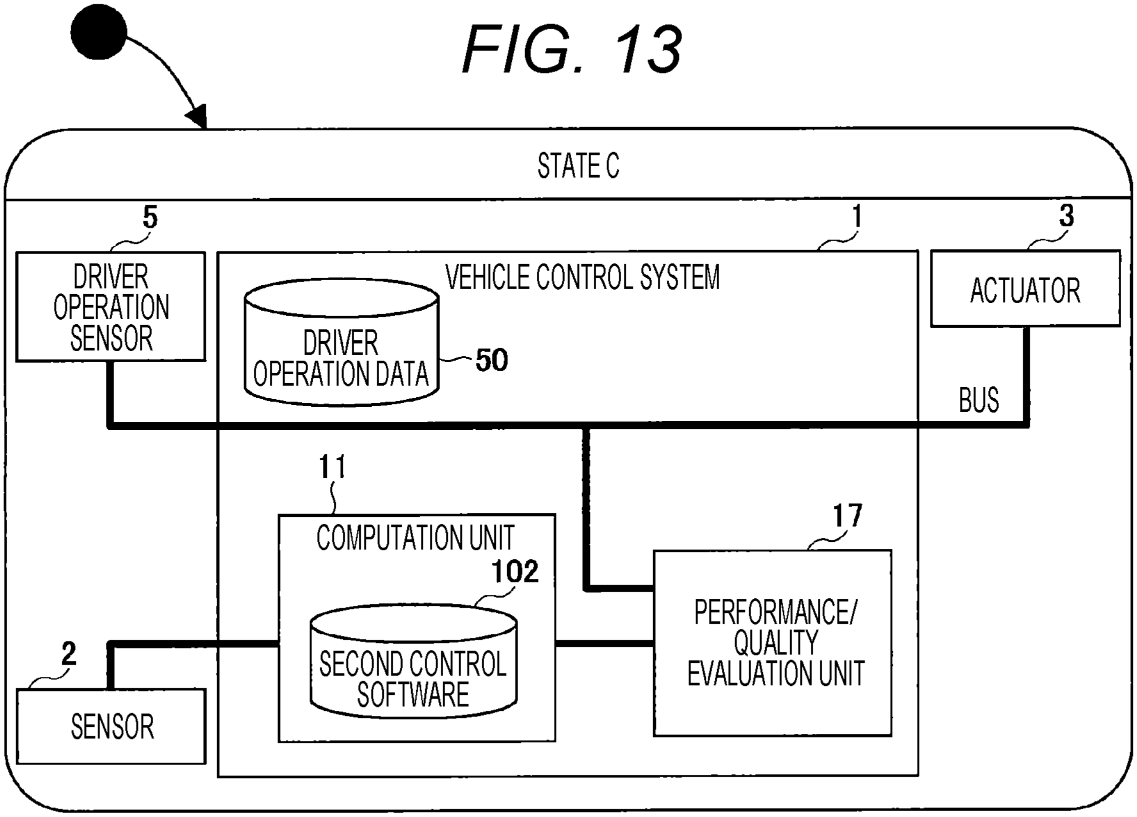
FIG. 13 depicts an example of state transition of the vehicle control system according to the third embodiment of the present invention.

FIG. 13 depicts an example of state transition of the vehicle control system 1 according to the third embodiment. It is assumed that the vehicle control system 1 has transitioned to a state C.

At the computation unit 11 of the vehicle control system 1, the second control software 102 executes computation using an output value from the sensor 2. When transition to the state C is made, the performance/quality evaluation unit 17 of the vehicle control system 1 directly receives driver operation data 50, which is an output value from the driver operation sensor 5. The performance/quality evaluation unit 17 receives also the second control software output data 1020 that the computation unit 11 computes, using the second control software 102. The performance/quality evaluation unit 17 is different from that of the first embodiment in the way the performance/quality evaluation unit 17 evaluates performance and quality of the second control software 102 and allows execution of shadow mode testing.

Figure 14:
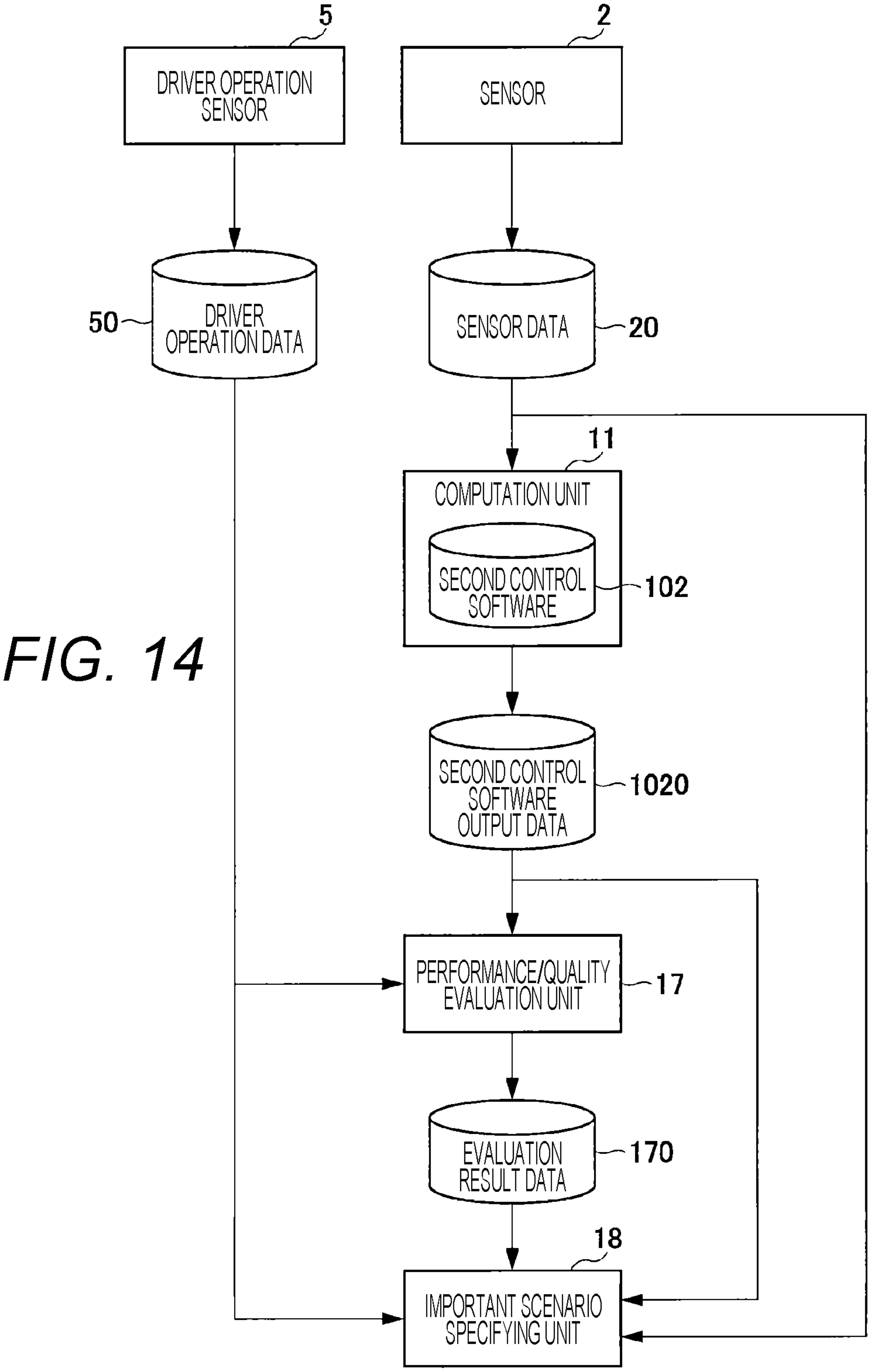
FIG. 14 depicts an example of a data flow in a state C of the vehicle control system according to the third embodiment of the present invention.

FIG. 14 depicts an example of a data flow in one state (state C) of the vehicle control system 1 according to the third embodiment.

As described above, the driver operation sensor 5 outputs a driver's operation amount, such as an amount of steering wheel operation or an amount of stepping on the brake pedal by the driver, as the driver operation data 50. The sensor 2, on the other hand, outputs a sensing result as the sensor data 20.

Based on the received sensor data 20, the computation unit 11 carries out a computation process of the second control software 102, and outputs the second control software output data 1020. The performance/quality evaluation unit 17 receives the driver operation data 50 and the second control software output data 1020. Based on a result of comparison of both received data, the performance/quality evaluation unit 17 then evaluates the performance and quality of the second control software 102, and outputs the evaluation result data 170.

The important scenario specifying unit 18 receives the driver operation data 50, the sensor data 20, the second control software output data 1020, and the evaluation result data 170, and specifies an important scenario, based on the content of the evaluation result data 170. In the above-described manner, the performance/quality evaluation unit 17 is different from that of the first embodiment in that the performance/quality evaluation unit 17 is able to evaluate the performance and quality of the second control software 102 by using the driver operation data 50 in place of the first control software 101.

According to the above-described vehicle control system 1 of the third embodiment, the performance and quality of the second control software 102 that executes computation during traveling of the vehicle is evaluated, using the driver operation data 50 in place of the first control software 101. In this manner, the vehicle control system 1 allows execution of shadow mode testing during traveling of the vehicle (state C).

For example, as the driver of the vehicle is performing a driving operation, the vehicle control system 1 sets the state of the vehicle to the state C and executes the second control software 102 in the background.

Then, the performance/quality evaluation unit 17 compares the driver operation data 50 obtained by the driver's driving with the second control software output data 1020 outputted from the second control software 102 in a real time manner, and evaluates a comparison result. Therefore, the performance/quality evaluation unit 17, for example, confirms a degree of matching between a track the vehicle takes when the driver steering the vehicle finds a falling object or the like lying ahead and drives in a zigzag line and a track of the vehicle created by the second control software 102 having recognized an image, thereby being able to evaluate the performance and quality of the second control software 102.

<Hardware Configuration of Computer>

A hardware configuration of the computer 60 making up the vehicle control system 1 will then be described.

Figure 15:
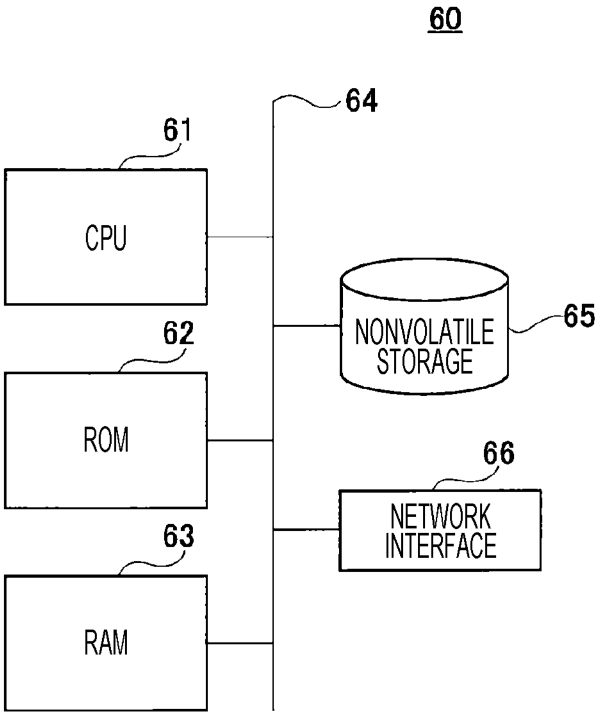
FIG. 15 depicts an example of a hardware configuration of a computer according to each embodiment of the present invention.

FIG. 15 is a block diagram of an example of a hardware configuration of the computer 60. The computer 60 is an example of hardware used as a computer that can operate as the vehicle control system 1 according to the present embodiments.

The computer 60 includes a central processing unit (CPU) 61, a read-only memory (ROM) 62, and a random access memory (RAM) 63 which are each connected to a bus 64. The computer 60 further includes a nonvolatile storage 65 and a network interface 66.

The CPU 61 reads a program code of software that implements functions according to the present embodiments, from the ROM 62, loads the program code into the RAM 63, and executes the program code. Variables, parameters, and the like generated during computation by the CPU 61 are temporarily written to the RAM 63, and these variables, parameters, and the like are read by the CPU 61 on a necessary basis. In place of the CPU 61, a micro processing unit (MPU) may be used. Functions of the computation unit 11, the comparison reference data selecting unit 12, and the like shown in FIG. 1 and the like are implemented by the CPU 61.

As the nonvolatile storage 65, for example, a hard disk drive (HDD), a solid state drive (SSD), a flexible disk, an optical disk, a magneto-optical disk, a CD-ROM, a CD-R, a magnetic tape, a nonvolatile memory, or the like is used. The nonvolatile storage 65 records therein an operating system (OS) and various parameters, and a program that causes the computer 60 to function as well. The ROM 62 and the nonvolatile storage 65 record programs, data, and the like the CPU 61 needs to operate, and are used as an example of computer-readable non-transitory storage media storing programs executed by the computer 60. The control software 10 and the comparison reference data saving unit 13, which are shown in FIG. 1 and the like, are configured in the nonvolatile storage 65.

For example, a network interface card (NIC) or the like is used as the network interface 66, and various data can be transmitted and received between devices via a local area network (LAN), a dedicated line, or the like connected to a terminal of the NIC. For example, interfacing with the sensor 2 and the actuator 3 and communication with the cloud server 4 is made through the network interface 66. Furthermore, communication between the vehicle control system 1 and the sensor 2 and actuator 3 is made through, for example, a controller area network (CAN).

The present invention is not limited to the embodiments described above. Obvious to say, the present invention may be embodied in various applications and modifications other than the embodiments, proving that such applications and modifications do not depart from the substance of the present invention that is described in the claims.

For example, in each embodiment described above, configurations of devices and systems are described specifically in detail to facilitate understanding of the present invention, and the embodiment is not necessarily limited to one that includes all configurations described above. Some constituent elements of one embodiment described above may be replaced with constituent elements of another embodiment, and a constituent element of another embodiment may be added to a constituent element of one embodiment. In addition, some of constituent elements of each embodiment can be deleted therefrom or add to or replaced with constituent elements of another embodiment.

A group of control lines/information lines considered to be necessary for description are illustrated, and all control lines/information lines making up the product are not necessarily illustrated. It is safe to assume that, actually, almost the entire constituent elements are interconnected.

REFERENCE SIGNS LIST

1 vehicle control system
2 sensor
3 actuator group
10 control software
11 computation unit
12 comparison reference data selecting unit
13 comparison reference data saving unit
14 state determining unit
15 process program switching unit
16 evaluation software execution instruction unit
17 performance/quality evaluation unit
18 important scenario specifying unit
20 sensor data
21 selected sensor data
101 first control software
102 second control software
140 state determination result data
170 evaluation result data
1010 first control software output data
1011 selected first control software output data
1020 second control software output data

The invention claimed is:

1. A vehicle control system comprising:

a computation unit that executes a computation of first control software when a vehicle is in a first state, the computation unit executing a computation of second control software when the vehicle is in a second state, wherein the first state comprises an autonomous driving state of the vehicle, and the second state comprises manual driving state;

a saving unit that saves input data from a sensor to the first control software and to the second control software, the saving unit saving output data that the first control software and the second control software output as a result of a computation executed with the input data as input to the computation; and an evaluation unit that compares pieces of the output data outputted respectively from the first control software and the second control software, the output data being read from a storage unit, to evaluate performance of the second control software.

2. The vehicle control system according to claim 1, comprising a selecting unit that selects the input data and the output data that the evaluation unit uses to evaluate the second control software, from the input data that is inputted to the first control software and the output data that is outputted from the first control software, and that stores the selected input data and the selected output data in the saving unit.

3. The vehicle control system according to claim 2, wherein the selecting unit selects data to be stored in the saving unit as an important scenario for evaluation of the second control software by the evaluation unit, based on the output data that is outputted from the first control software.

4. The vehicle control system according to claim 3, comprising:

a state determining unit that determines whether the vehicle is in the first state or the second state, based on availability of computation resources on which the computation unit operates; and a switching unit that when the state determining unit determines that no available computation resources are present, specifies the first control software as control software with which the computation unit executes the computation of the first control software, and that when the state determining unit determines that available computation resources are present, switches the control software with which the computation unit executes the computation of the second control software.

5. The vehicle control system according to claim 4, comprising an execution instruction unit that instructs the computation unit to execute the computation using the second control software that is the switched software resulting from switching by the switching unit, with the input data stored as the important scenario in the saving unit being processed as input.

6. The vehicle control system according to claim 4, comprising an important scenario specifying unit that receives an evaluation result from the evaluation unit, the input data and the output data selected by the selecting unit, and the output data that is outputted from the second control software, and specifies data to be stored in the saving unit, as an important scenario, based on the evaluation result.

7. The vehicle control system according to claim 6, wherein the important scenario specifying unit specifies an important scenario including output data from the first control software and output data from the second control software, both the output data being evaluated as unmatching data by the evaluation result.

8. The vehicle control system according to claim 6, wherein when it is determined that the first control software is running and an output result from the first control software is erroneous, the important scenario specifying unit stores data specified as the important scenario in the saving unit.

9. The vehicle control system according to claim 8, wherein when the selecting unit finds that a result obtained by carrying out a sensor fusion process of fusing together a plurality of pieces of the input data that is inputted from a plurality of types of the sensors does not match the output data that is outputted as a result of the computation executed by the first control software, the selecting unit determines that an output result from the first control software is erroneous.

10. The vehicle control system according to claim 8, wherein when the selecting unit finds that a traveling log of the vehicle acquired by the vehicle does not match the output data that is outputted as a result of the computation executed by the first control software, the selecting unit determines that an output result from the first control software is erroneous.

11. The vehicle control system according to claim 8, wherein when the selecting unit finds that map data the vehicle has does not match the output data that is outputted as a result of the computation executed by the first control software, the selecting unit determines that an output result from the first control software is erroneous.

12. The vehicle control system according to claim 4, wherein the state determining unit determines whether available computation resources on which the computation unit operates are present, based on at least one of an autonomous service offering range, the vehicle's being charged, the vehicle's being stopped, and load information on a computer incorporated in the vehicle, and determines whether the evaluation unit can execute the evaluation of the second control software.

13. The vehicle control system according to claim 6, wherein the computation unit executes a computation of the second control software received from a cloud server via a network, and transmits an evaluation result by the evaluation unit, the evaluation result being specified as the important scenario by the important scenario specifying unit, the input data and the output data that are selected by the selecting unit, and the output data from the second control software, to the cloud server.

14. A vehicle control method comprising:

executing a computation of first control software when a vehicle is in a first state and executing a computation of second control software when the vehicle is in a second state, wherein the first state comprises an autonomous driving state of the vehicle, and the second state comprises manual driving state;

storing input data that is inputted from a sensor to the first control software and to the second control software, in a saving unit and storing output data that the first control software and the second control software output as a result of a computation executed with the input data as input, in the saving unit; and comparing pieces of the output data that is outputted respectively from the first control software and the second control software, the output data being read from the saving unit, to evaluate performance of the second control software.

15. A vehicle control system comprising at least one processor configured to:

execute a computation of first control software when a vehicle is in a first state and a computation of second control software when a vehicle is in a second state, wherein the first state comprises an autonomous driving state of the vehicle, and the second state comprises manual driving state;

saving input data from a sensor to the first control software and to the second control software, the saving unit saving output data that the first control software and the second control software output as a result of a computation executed with the input data as input to the computation; and comparing pieces of the output data outputted respectively from the first control software and the second control software, the output data being read from a storage unit, to evaluate performance of the second control software.

* * * * *